Nov. 20, 1951  B. R. GOSSICK  2,575,447
FAIL-SAFE FEATURE FOR BALANCED BRIDGE INDICATORS
Filed Oct. 4, 1947
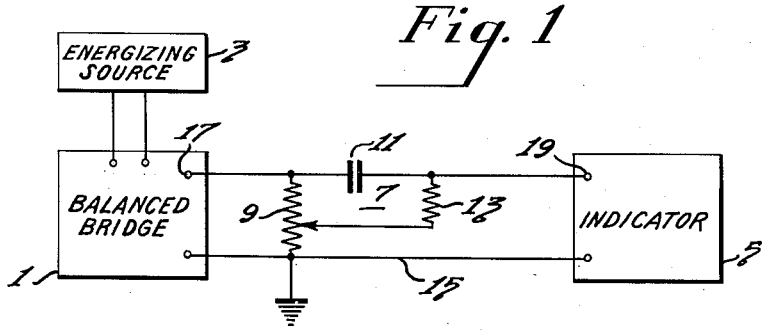
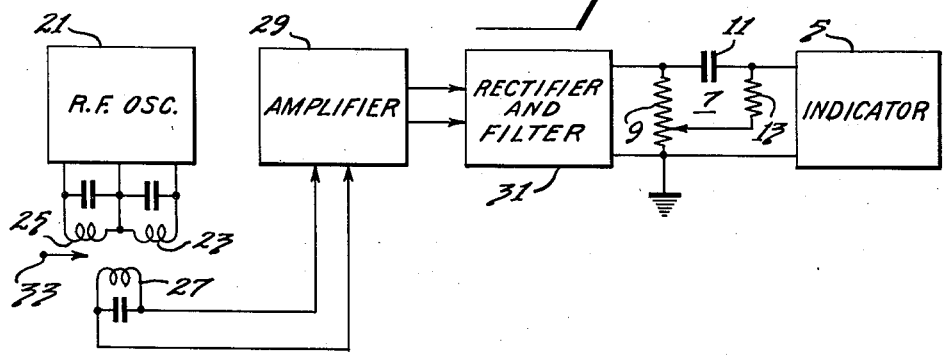
INVENTOR.
Ben R. Gossick
BY
ATTORNEY.

Patented Nov. 20, 1951

2,575,447

UNITED STATES PATENT OFFICE 2,575,447

FAIL-SAFE FEATURE FOR BALANCED BRIDGE INDICATORS

Ben R. Gossick, Moorestown, N. J., assignor to Radio Corporation of America, a corporation of Delaware Application October 4, 1947, Serial No. 777,945

5 Claims. (Cl. 175—183)

This invention relates to balanced bridge indicators, and particularly to a "fail-safe" feature for balanced bridge indicators.

The use of balanced bridge networks for producing a voltage indicative of a departure from a given condition is well known. In such cases the bridge circuit includes an element which produces a voltage or whose impedance changes in proportion to a condition to be measured, such as time, temperature, pressure, light intensity or the presence of an object in an electric or electromagnetic field, for example.

In many industrial applications balanced bridge networks are employed to detect metallic foreign particles in samples of dielectric material which are passed through a testing device. The particles are detected by their unbalancing effect on the normally balanced bridge network. An indicator is coupled to the network which is responsive to a relatively rapid change in the amplitude of the unbalance or "error" voltage. Examples of such devices are the Metal Detector described and claimed in a copending application of J. H. Reynolds, Serial No. 568,045, filed December 13, 1944, now Patent No. 2,513,745, issued July 4, 1950, and the improved Metal Detector described and claimed in my copending application Serial No. 742,672, filed April 19, 1947.

Previously known devices of this type have had the disadvantage that the normally balanced bridge network might slowly drift out of balance, due to changes in ambient temperature, and the like, to a point where the sensitivity of the device would be destroyed. The slow drift would not produce a signal voltage of sufficient amplitude to actuate the indicator, and therefore the operator would be unaware that the device was no longer functioning properly. It is the primary object of this invention to provide an indicating system which will warn the operator when this condition occurs. Such a warning device, operative when the system becomes incapable of functioning satisfactorily, is known as a fail-safe device.

It is a further object of this invention to provide an improved rate-of-change indicator.

A further object is to provide fail-safe operation for balanced bridge indicators of the type which are non-responsive to slow changes from a predetermined condition of balance so as to maintain full sensitivity to relatively rapid changes from the predetermined condition.

A further and more specific object of the invention is the provision of fail-safe operation for metal detectors employing a normally balanced bridge network.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Fig. 1 is a circuit diagram of a fail-safe indicator, shown partly in block-diagram form; and Fig. 2 is a circuit diagram of a similar fail-safe feature applied specifically to a metal detector.

Referring to Fig. 1, a balanced bridge 1 is energized by a suitable source of energizing potential 3. The conjugate output terminals of the bridge are connected to an indicator 5 by means of a coupling network 7.

The bridge may be of any conventional variety, including in one arm thereof an element responsive to the condition to be indicated. It is assumed that the responsive device causes the bridge network to become electrically unbalanced when the condition changes from a predetermined value, and further that it is a relatively rapid change in the degree of unbalance that is indicative of the information to which the indicator 5 is to respond.

Coupling network 7 includes a potentiometer 9, the resistance element of which is connected between the common ground lead 15 and the high potential output terminal 17 of the bridge. Terminal 17 is connected through a capacitor 11 to the high potential input terminal 19 of the indicator 5. The movable contact of potentiometer 9 is connected to the indicator input terminal 19 through a resistor 13.

It is assumed that indicator 5 is of the type which responds to a D. C. voltage exceeding some predetermined amplitude. For example, the indicator may include a gas discharge tube which is caused to fire when its grid potential is raised above the critical value. The indicator 5 may, of course, include a D. C. amplifier to raise the level of signal voltage produced by the bridge to the value necessary to operate the indicator. It is also to be understood that the output of the balanced bridge 1 is a D. C. voltage. This may be accomplished either by designing bridge 1 to function as a D. C. bridge and applying to it a D. C. voltage from source 3, or by designing bridge 1 as an A. C. bridge, energizing it by an A. C. voltage from source 3, and including a suitable rectifier, not shown, between the bridge output terminals and the input of the coupling network 7.

As is well known, the amplitude of the voltage which will be applied to indicator 5 will depend upon the rate of change of the amplitude of the voltage produced by the bridge, for a capacitor of given size. This effect has been employed in previously known metal detectors, for example, in order to prevent the indicator from responding to slow changes in the condition of unbalance which always occurs in any sensitive balanced bridge. Rapid changes are produced by foreign particles in the material under test by moving the material fairly rapidly through the test position, thus making it possible to detect the moving particle.

As a result, it has now been found that it is possible for the bridge to slowly drift out of balance. Since the unbalance voltage is substantially constant, the indicator will not respond. However, the sensitivity of the device may be reduced greatly, making it impossible to detect small particles. Unless the operator continually checks the equipment he will not be aware that such a condition exists. When the condition is discovered it may be necessary to recheck all the material which had passed through the detector since the previous check was made.

This possibility is obviated by providing a "fail-safe" circuit in the coupling network. It may consist, for example, simply of potentiometer 9 and resistor 13. The purpose of these elements is to apply to the indicator 5 a predetermined portion of the D. C. bridge unbalance voltage. It will be seen that if the movable contact is placed at the ground end of potentiometer 9, there will be no transfer of the constant unbalance D. C. voltage. If the movable arm is placed at or near the top of the potentiometer resistance all or a substantial portion of the D. C. unbalance voltage will be applied to the indicator. Between these two extremes any value may be selected and this will control the degree of unbalance necessary to actuate the indicator, thus warning the operator that the system has drifted out of balance.

Thus, capacitor 11 is coupling means responsive only to changes in the degree of unbalance of bridge 1, while the potentiometer resistor combination is responsive to the degree of unbalance of the bridge. The relative coupling effect may be adjusted by potentiometer 9.

In practice, tests are made to determine how far out of balance the bridge can become without destroying the utility of the detector for the purpose intended. Thus, if the intended purpose of the bridge is to detect or indicate the presence of particles of a given size, or greater, moving on a conveyor belt at a given speed, a particle of the smallest size to be detected is passed through the device, each time the bridge being unbalanced a little more by any convenient means. When the point is reached where the indicator no longer responds to the test specimen, the bridge balance should be restored to a point just below this limiting value, and potentiometer 9 then set at such a position that the indicator just operates. The bridge is then rebalanced and may be used without further concern over its sensitivity. If the bridge thereafter drifts out of balance the indicator will operate continuously and will not be able to reset itself, if a reset type is used, and cannot be reset manually until the bridge is rebalanced. But in the meanwhile the device has been able to respond without failure to all foreign particles passing through it.

Fig. 2 illustrates a form of the A. C. bridge described briefly above.

A radio frequency oscillator 21 provides a high frequency alternating voltage in push-pull relation to two identical primary coils 23 and 25. A secondary coil 27 is positioned so as to be coupled equally to the two primary coils. If desired, the coils may be tuned to resonance at the operating frequency. The voltage induced in the secondary 27 may be amplified by an amplifier 29, if necessary, rectified and filtered by a rectifier and filter 31, and the resulting D. C. voltage applied to the coupling network 7. The coupling network functions and is adjusted as described above. The bridge is used, for example, to indicate the presence of a metal particle 33, which is moved through the coupling field of the primary and secondary coils.

There has thus been described a novel balanced bridge indicator of the type normally responsive to changes in the degree of unbalance of the bridge which includes a fail-safe feature for operating the indicator when the bridge becomes unbalanced an amount sufficient to interfere with its proper functioning.

What I claim is:

1. In a device of the character described having a normally balanced bridge network having a D. C. output voltage and a direct-current indicator responsive to the unbalancing of said bridge, the combination of capacity means coupling said indicator to said bridge which is responsive only to changes in the degree of unbalance of said bridge, and other conductive means coupling said indicator to said bridge which is responsive to the degree of unbalance of said bridge, said last named means including a potentiometer shunted across the bridge output at the input side of said capacity coupling means and having a movable contact, and a resistor connected between said contact and the output side of said capacity coupling means.

2. In a device of the character described having a normally substantially balanced radio frequency bridge network and an unbalance indicator operative in response to a D.-C. control voltage exceeding a predetermined amplitude, the combination of rectifying means coupled to said bridge for producing a D.-C. voltage varying in amplitude in accordance with the degree of unbalance of said bridge, a capacitor for applying to said indicator a first control voltage representative of changes in the amplitude of said D.-C. voltage; and a resistance divider network for selecting and applying to said indicator a portion of said D.-C. voltage as a second control voltage representative of a relatively constant value of said D.-C. voltage.

3. A device of the character described in claim 2 which includes, in addition, means for adjusting the relative effectiveness of said first and second control voltages.

4. In a metal detector having a normally substantially balanced radio frequency bridge network the degree of unbalance of which is affected by the movement of metal particles to be detected, and an indicator operative in response to a D.-C. control voltage exceeding a predetermined amplitude, the combination of a rectifier coupled to said network for producing a D.-C. voltage varying in amplitude in accordance with the degree of unbalance of said bridge network; a capacitor connected between said rectifier and said indicator for applying to said indicator a first control voltage representative of relatively rapid changes in the degree of unbalance of said network due to the movement of said particles, and a resistance divider network including a potentiometer and a control resistor connected between said rectifier and said indicator for applying to said indicator a second control voltage representative of the degree of unbalance of said bridge network.

5. A device of the character described in claim 4 in which said resistance divider attenuates said second control voltage to a value below said predetermined value when the degree of unbalance is insufficient to affect the sensitivity of said device to the movement of said particles.

BEN R. GOSSICK.

REFERENCES CITED

The following references are of record in the file of this patent:

UNITED STATES PATENTS

| Number | Name | Date |
|---|---|---|
| 1,361,992 | Hellmund | Dec. 14, 1920 |
| 2,113,436 | Williams | Apr. 5, 1938 |
| 2,356,617 | Rich | Aug. 22, 1944 |
| 2,406,870 | Vacquier | Sept. 3, 1946 |
| 2,489,920 | Michel | Nov. 29, 1949 |